United States Patent [19]
Lemoine

[11] Patent Number: 5,631,839
[45] Date of Patent: May 20, 1997

[54] DEVICE FOR CONTROLLING THE PARAMETERS OF A MANUFACTURING PROCESS

[75] Inventor: Michel Lemoine, rue des Roses, France

[73] Assignee: Eastman Kodak Company, Rochester, N.Y.

[21] Appl. No.: 492,360

[22] Filed: Jun. 19, 1995

[30] Foreign Application Priority Data

Jul. 18, 1994 [FR] France .................................. 9409070

[51] Int. Cl.[6] .................................................. G06F 19/00
[52] U.S. Cl. ................ 364/468.15; 364/138; 364/551.01
[58] Field of Search .................................. 364/468, 138, 364/139, 550, 551.01, 468.01, 968.02, 468.15, 468.16, 468.17, 131–136; 340/825.06, 825.07

[56] References Cited

U.S. PATENT DOCUMENTS

| | | | |
|---|---|---|---|
| 4,234,926 | 11/1980 | Wallace et al. | 364/138 X |
| 4,517,637 | 5/1985 | Cassell | 364/138 |
| 4,573,115 | 2/1986 | Halgrimson | 364/138 |
| 4,935,863 | 6/1990 | Calvas et al. | 364/138 |
| 5,016,184 | 5/1991 | Gutnahr | 364/138 X |
| 5,122,948 | 6/1992 | Zapolin | 364/131 |
| 5,249,140 | 9/1993 | Kessler | 364/131 X |
| 5,251,151 | 10/1993 | Demjanenko et al. | 364/551.02 X |

*Primary Examiner*—Joseph Ruggiero
*Attorney, Agent, or Firm*—Mark G. Bocchetti; Arthur H. Rosenstein

[57] ABSTRACT

The invention concerns a device for controlling a complex manufacturing process. The device comprises at least one remote monitor designed to receive in real time signals through a local area network making it possible to analyse the state of the manufacturing process. There are a plurality of sensors, each of the sensors transforming the value of an associated parameter of the manufacturing process so as to produce an analogue signal. There is an analogue to digital converter associated with each of the sensors for producing a succession of numerical values representing the instantaneous state over time of the corresponding parameter. Each of the converters is interfaced with the local area network. A processor for processing the numerical values and comparing them with given reference values is also connected to the local area network such that the local area network conveys the result of the comparison to the remote monitor or monitors and also conveys the information coming from the analogue to digital converter to the processing means.

8 Claims, 5 Drawing Sheets

DEVICE FOR CONTROLLING THE PARAMETERS OF A MANUFACTURING PROCESS

FIELD OF THE INVENTION

The invention concerns a device for continuously controlling the parameters of a manufacturing process in order to perceive continuously any transient or perturbational phenomena occurring during the manufacturing process.

BACKGROUND OF THE INVENTION

French Patent Application No 9214680, filed on Nov. 26, 1992 in the name of the Applicant, describes a method and installation for monitoring, continuously and in real time, a complex manufacturing process.

FIG. 1, to which reference is now made, shows diagrammatically a monitoring installation as described in the patent application mentioned above. The purpose of this installation is to monitor continuously a complex manufacturing process. The manufacturing process is implemented by a machine in order to convert a raw material into a finished product. In order to be able to monitor the manufacturing process, sensors are disposed which monitor the machine and the product at any stage in its conversion. The arrangement and nature of each of the sensors are chosen so as to be able to monitor a basic element of the manufacturing process. Thus sensors are used for temperature, pressure, tension, vibration, illumination, thickness, speed, flow rate, electrical charges, potential, optical density or viscosity, as well as any other type of sensor useful for monitoring one of the basic elements of the manufacturing process.

Each sensor forms part of a channel $C_1, C_2, \ldots, C_n, \ldots$. Each channel sends a signal to a network 10, in a manner which is well known in the art. This signal then reaches monitors 12a, 12b, 12c.

The network 10 can be any type of local area network such as for example FILBUS, described notably in Control Engineering of October 1987, or in Minis et Micros No 313 of 19 Dec. 1988. The network may also be the FIP network described in the draft standards NF C46-601 to NF C46-607. An FIP network was used, formed by a shielded twisted pair operating at 2.5 MHz, but it is obvious that the information could be passed just as well over optical fibres at 5 MHz as recommended by FIP in a particular embodiment.

The monitors 12a, 12, 12c are equipped with suitable cards, for example an FIP coupler card (CC 105 made by Cegelec®), so as to be connected to the network 10 in order to receive the information supplied by the set of channels $C_1, C_2, \ldots C_n, \ldots$. Advantageously, the monitors 12a and 12c may take the form of microcomputers of the PC 486 type or similar. In particular it makes it possible to analyse the information received and to correlate the information coming from the different sensors. The monitor 12b also may consist of a microcomputer of the PC 486 type or similar.

Advantageously, this monitor makes it possible to feed a data base 14 for collecting information relating to the manufacturing process and to build up a history for the purpose of subsequent use in order to study any slow or cyclic drifts as a function of external parameters. It is obvious that, in order to be able to produce correlations between the signals coming from the different sensors or to build up a history which can be used subsequently, each spectrum or signal must be accompanied by a synchronisation signal coming for example from a single clock internal to the system. The monitors automatically determine the time taken by the product to pass from one given sensor to another sensor as a function of the speed of movement of the product, which can be measured by other sensors. The monitor 12b can be equipped with a network card of the IEEE 802 type so as to be able to interrogate the data base in non real time through a network 16, by means of a remote workstation 18, which may be a DEC® station operating in WINDOWS®.

As shown in FIG. 1, the network 10 is also connected to actuators $A_1, A_2, \ldots A_p$, which enable control means of the machine to be used. The monitor 12c communicates with the monitor 12a and may comprise an expert system for using, on receipt of information coming from the monitor 12a, the appropriate actuators.

The actuators Ai have a structure similar to the channels Ci in which the sensors 20 are replaced with motors or the like, often referred to as actuators in the art. Each actuator transmits the instructions from the network 10 to a motor, for example, passing through the processor 28.

The mode of functioning of the actuators is considered as the inverse of the mode of functioning of the acquisition channels and is characterised in that the objective parameters supplied by the monitor 12c are used by any inverse spectral analysis means (inverse FFT, for example, or any other algorithm such as digital filter, adaptative commands and real time identification of the process), with precise control of the phase (in order to avoid any hunting phenomenon) so as to generate an analogue signal, the spectral components of which tend to minimise the frequencies disturbing the product.

FIG. 2, to which reference is now made, illustrates diagrammatically one of the monitoring channels, as used in the application mentioned above.

As mentioned before, a sensor 20 is used in order to convert the physical phenomenon to be monitored into an analogue electrical signal. The sensor 20 is associated with conditioners 21 which make it possible to provide a signal of relatively high amplitude lying for example between ±100 mV and ±10 V, so as to be able to reach the analogue to digital converter situated a short distance away (approximately one meter maximum) without being affected to any great extent.

As can be seen in FIG. 2, the signal coming from the sensor is sent to a circuit 22 converting the analogue signal from the sensor 20 into a digital signal. In order to limit any noise which might occur on the connection between the sensor 20 and the circuit 22, the analogue to digital circuit is disposed as close as possible to the sensor 20. The parameters influencing the measurement are also supplied to the converter so as to be able to take account of influences external to the sensor on the measurement performed by the sensor 20. The circuit 22 comprises an anti-aliasing filter in order to meet the Shannon conditions relating to sampling, and a converter 24 which supplies a digital output signal which is a function of the amplitude of the analogue input signal.

The digitised signal is then sent to a circuit 25 and stored therein in a RAM 26 under the control of a microprocessor. Because of the particular utilisation envisaged, the microprocessor used is a DSP 56001 manufactured by MOTOROLA®. Acquisition of the signal takes place in real time. Advantageously, the memory 26 is a circular memory which can be obtained by means of a pointer involving a modulo function.

As can be seen clearly in FIG. 2, the processing module 25 and the conversion module 22 are located in the same physical entity. In reality, the unit 25 is connected to the unit 22 by means of a data bus. This entails the production of an interface card specific to each sensor used. This substantially increases the cost and complexity of the installation with regard to each of the sensors or actuators. In addition, since these cards are specific to each sensor or actuator, they must be produced one by one "to measure" according essentially to the envisaged application.

Another problem related to this approach lies in the fact that the acquisition, conversion and processing elements must be located geographically at the same place, only the monitoring devices being remote because of the use of the local area network 10.

Finally, the connection between the conversion module and the processing module 25 is liable to be disturbed by parasitics detrimental to the quality and reliability of the control and monitoring carried out.

SUMMARY OF THE INVENTION

One of the objects of the present invention is therefore to provide an installation which does not have the drawbacks which have just been discussed with reference to the prior art.

Other objects will emerge in more detail from the following description.

These objects are achieved by means of a device for continuously controlling a manufacturing process, in order to perceive continuously any transient or perturbational phenomena occurring during this process, this device comprises:

a) at least one remote monitor designed to receive in real time signals making it possible to analyse and/or observe the state of the manufacturing process;

b) at least one sensor, each of the sensors being associated with a parameter of the manufacturing process and measuring a value of the parameter which is associated therewith and transforming the said value so as to produce an analogue signal;

c) an analogue to digital converter associated with each of the sensors and situated in the immediate vicinity of the said sensor and receiving the said analogue signal in order to convert this analogue signal into a sequence of numerical values representing the instantaneous state over time of the corresponding parameter;

d) processing means for processing the said numerical values and comparing them with given reference values; and e) a local area network designed to convey the result of the comparison to the remote monitor or monitors;

the said device being characterised in that the said local area network is also used to convey the information coming from the analogue to digital converter to the processing and storage means.

Advantageously, the processing means are arranged so as to receive, process and store the values coming from a plurality of sensors via their respective analogue converters.

According to an alternative, each sensor is associated with a separate processing means.

By way of example, the processing means comprise:

i) means for transforming the time variations represented by the sequence of numerical values into signals representing frequency variations of the said analogue signal and then, after processing, storing the signals representing the frequency variations;

ii) an analyser receiving the said signals representing the frequency variations in order to convert them into a limited number of objective characteristics; and iii) storage means for storing the said objective characteristics.

According to a first embodiment of the invention, the means for converting the time variations into frequency variations effect a discret Fourier transform or any other numerical signal processing algorithm.

Advantageously also, the device according to the invention comprises in addition:

i) at least one actuator for implementing the process, each actuator being controlled by an analogue signal, the value of which influences the value of at least one corresponding parameter of the process;

ii) processing means for producing, according to the result of the comparison, a digital correction signal representing any modification to be made to the control signal for at least one of the said actuators used in the manufacturing process; and iii) a digital to analogue converter associated with each actuator in order to convert the digital correction signal into a corresponding analogue signal, the output of the digital to analogue converter being connected to the corresponding actuator so as to modify accordingly the value of the associated parameter or parameters, the said processing means being connected to the said corresponding digital to analogue converters by means of the said local area network.

BRIEF DESCRIPTION OF THE DRAWINGS

In the following description, reference will be made to the drawing in which.

DETAILED DESCRIPTION

The following detailed description, for reasons of simplicity, will confine itself to describing in detail the parts of the device which form the object of the invention. Thus, for example, for the different types of processing to which the measurements coming from the sensors may relate, for the programming of the calculation means, for the functioning of the monitors, reference can be made to the above-mentioned patent application in which all these elements are described in great detail.

Advantageously, however, the processing means 25 comprise means 28 for converting the time variations represented by the digital signal produced by the CAN 24 into signals representing frequency variations of the analogue signal coming from the sensor 20, and a memory 26 for storing, after processing, the signals representing the frequency variations. The computing means 28 also include an analyser receiving the signals representing frequency variations in order to convert them into a limited number of objective characteristics. The objective characteristics thus obtained are then stored in a memory 26.

Figure 3:
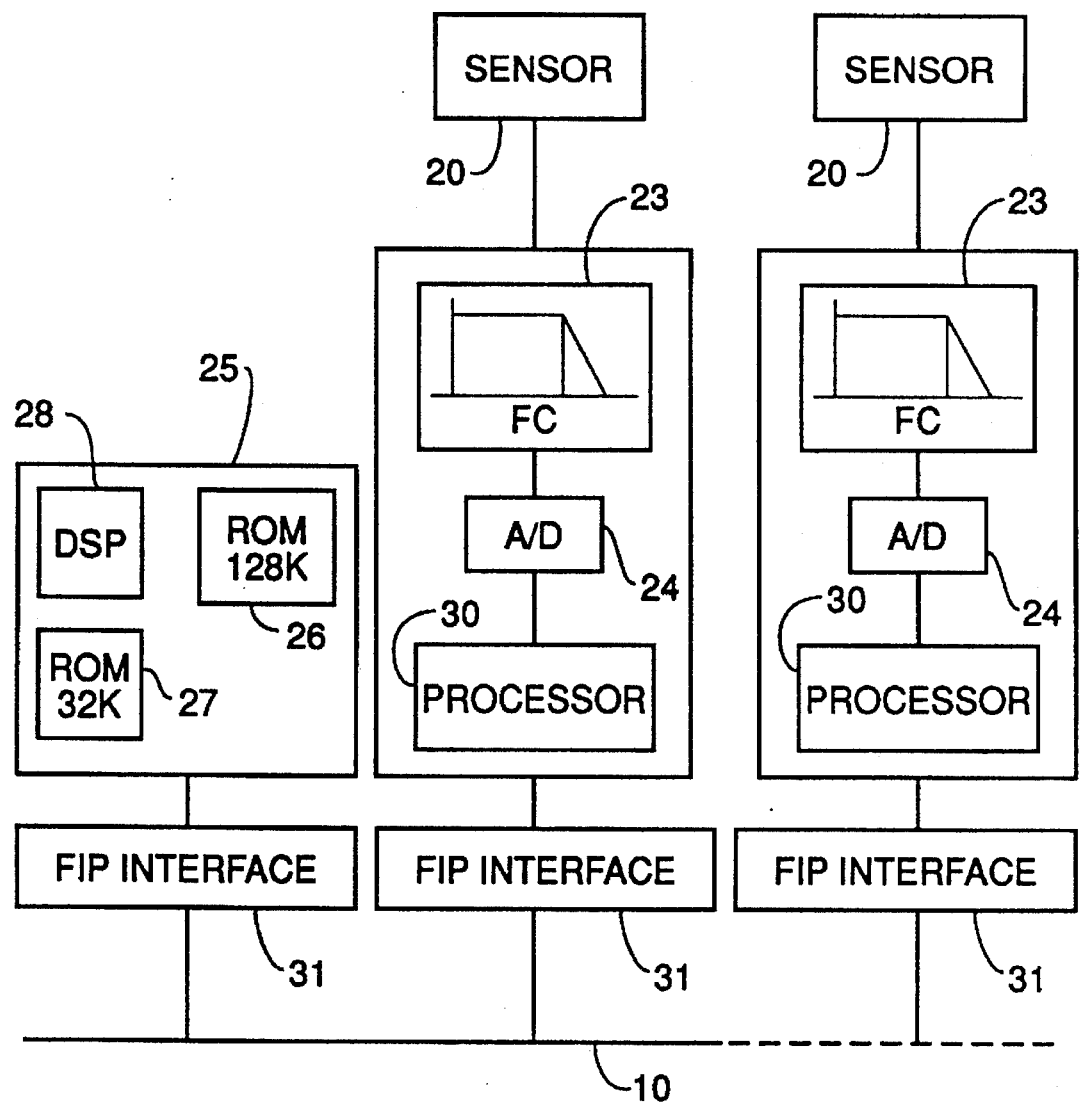
FIG. 3 shows diagrammatically a first arrangement of the control channels of the device according to the present invention.

FIG. 3, to which reference is now made, illustrates diagrammatically a first embodiment of the device according to the present invention.

Figure 1:
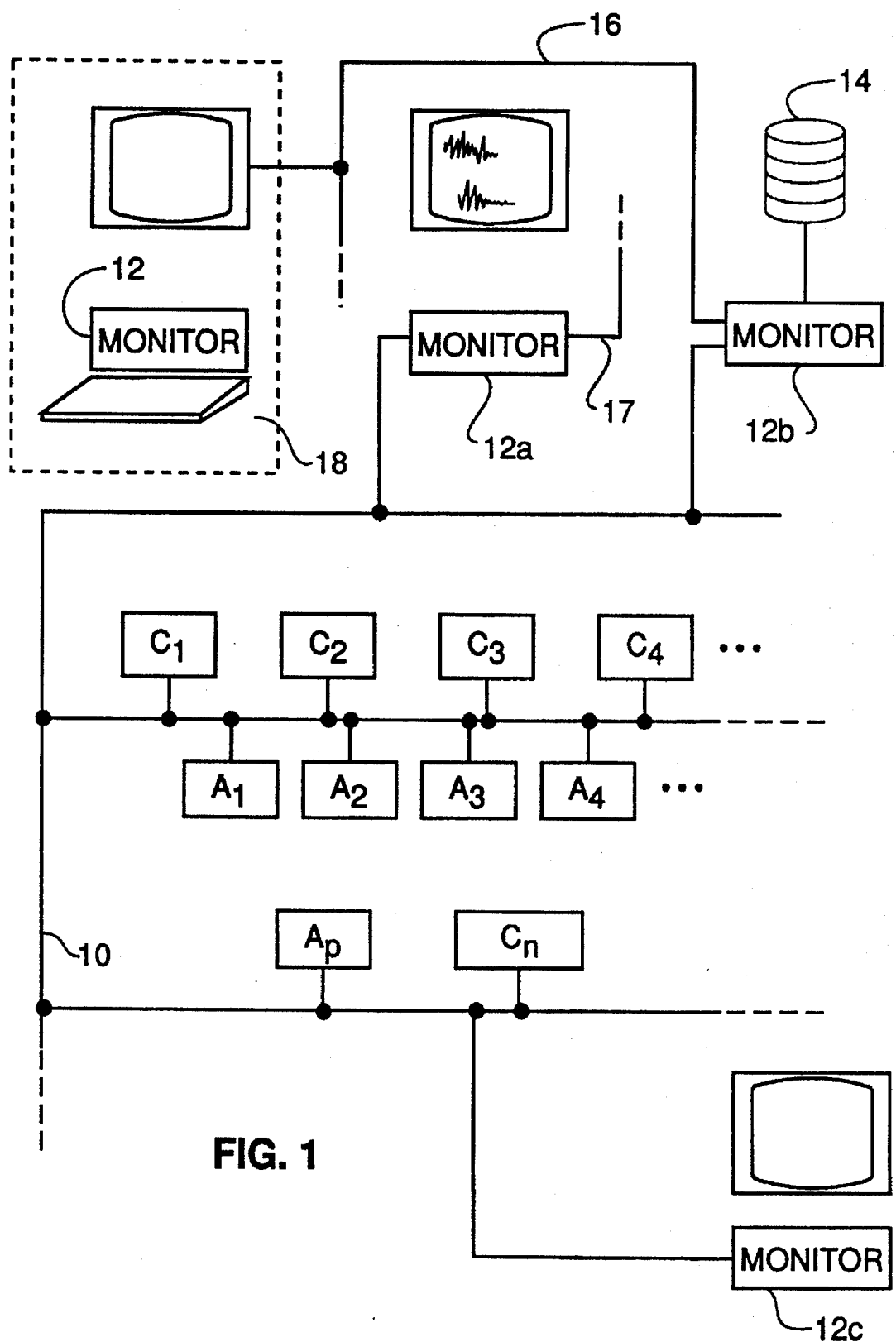
FIG. 1 shows a monitoring installation as described in the above-mentioned patent application FR.9214680.
Figure 2:
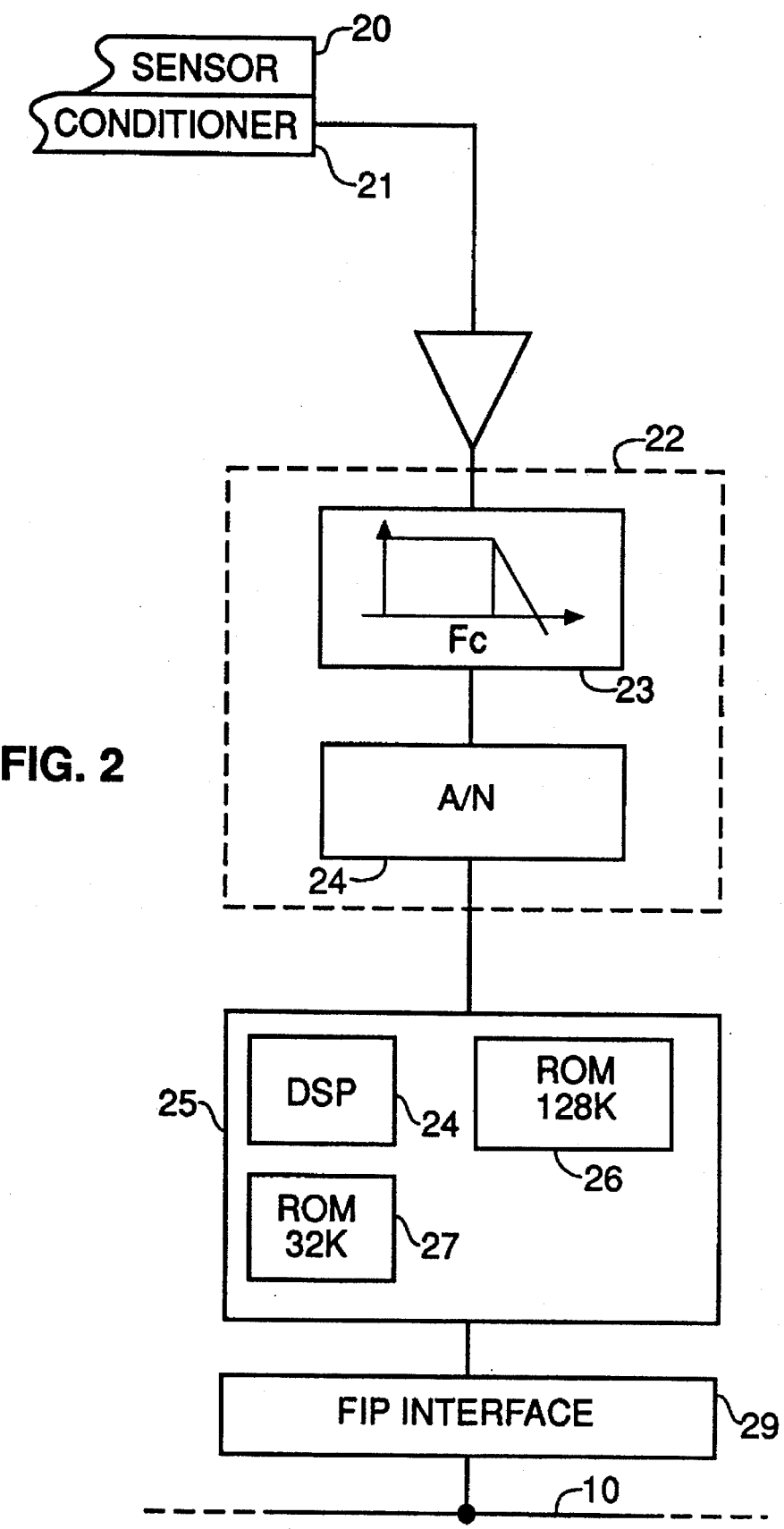
FIG. 2 illustrates diagrammatically a monitoring channel with sensors, used in the installation shown in FIG. 1.

It should be noted that the overall architecture of the control device according to the invention is in accordance with the one shown in FIG. 2 of the present application. The invention differs in reality from the device in FIG. 1 through the content and organisation of the boxes marked $C_1$, $C_2$, . . . $C_n$ and $A_1$, $A_2$, . . . $A_n$. The description which follows will describe the organisation of these boxes according to the invention.

FIG. 3 illustrates a first mode in which two sensors 20 are shown, placed at given positions on the machine implementing the process to be monitored. Each of the sensors is connected to a digitiser unit 23 of the type shown in FIG. 2.

According to an important characteristic of the invention, each of the digitiser units 23 is connected to a processing unit 25 (identical to the one described with reference to FIG. 2) by means of the local area network 10. According to this approach, each processing unit is provided with a processor 30, the function of which is to manage the exchanges between the digitiser units 23 (or the digital to analogue conversion units 40 when it is a case of controlling an actuator 33), and the interface cards 31 of the local area network 10. The processing units 23 are units which are commercially available. They are not in principle designed to be interfaced directly with a signal processor. The processor 30 is a component which is not dedicated to processing of the signal. It simply serves to manage the exchanges with the interface 31 of the local area network 10. With regard to the processing units 25, this management is provided by the DSP 28. The local area network 10 is of the type used in accordance with FIG. 2 between the processing and storage unit 25 and the monitoring devices 12a, 12b and consequently does not require any additional description. According to the device shown in FIG. 2, the digitiser units were connected to the processing units 25 by means of a conventional link. The advantages of the solution according to the present invention lie in the fact that the processing unit 25 can be remote from the sensor and from its associated processing unit. In addition, as shown in FIG. 3, it is possible to use a single processing unit common to several sensors. Finally, this type of connection by network has the advantage of being free of parasitics, which was not the case with the device in FIG. 2.

Figure 4:
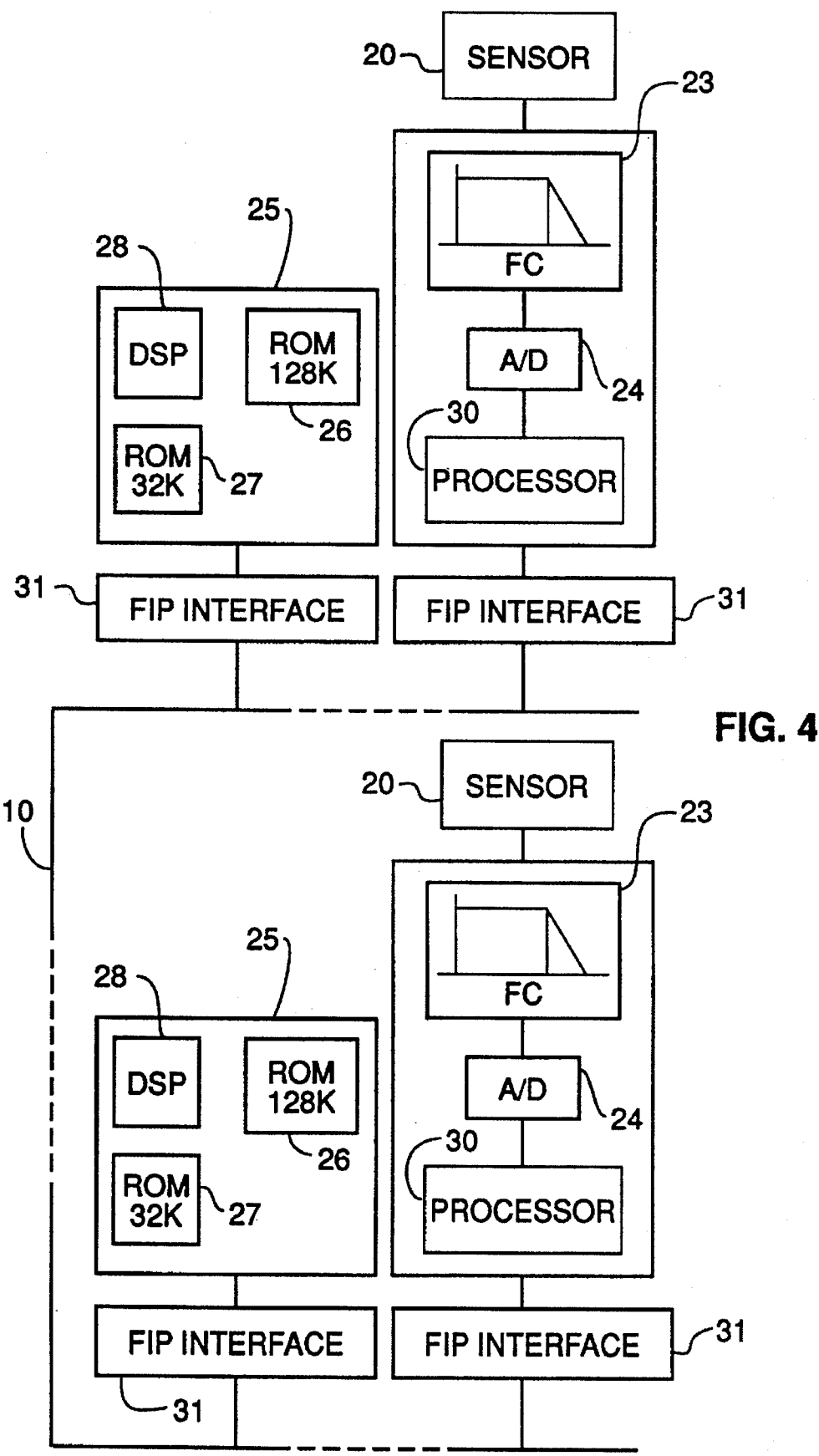
FIG. 4 shows diagrammatically a second arrangement of the control channels of the device according to the invention.

FIG. 4 shows an alternative to the embodiment in FIG. 3. According to this alternative, a separate processing station 25 is associated with each sensor 20.

Figure 5:
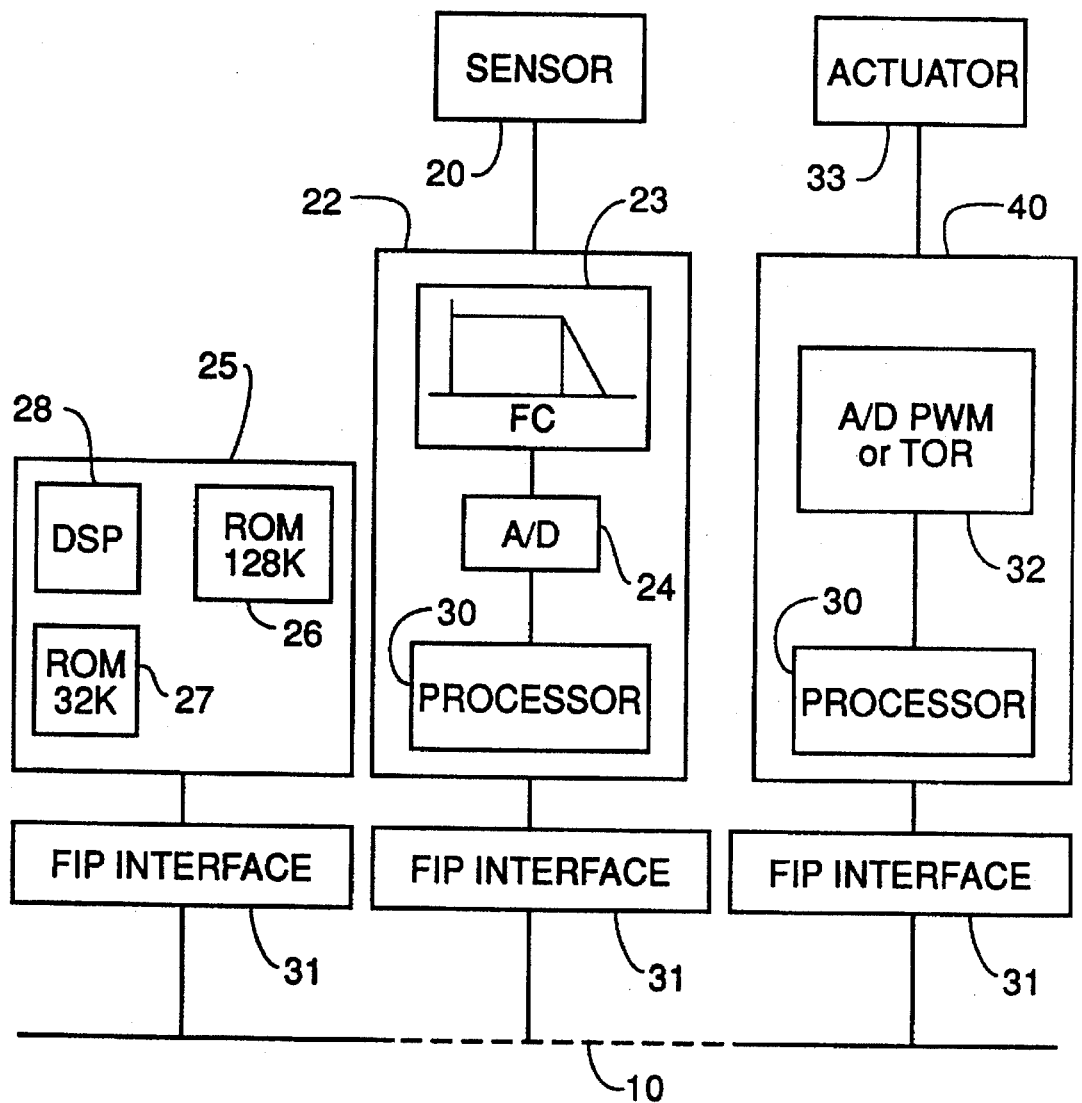
FIG. 5 shows a third arrangement of the control channels of the device according to the invention.

FIG. 5, to which reference is now made, illustrates another alternative to the device according to the present invention, According to this approach, the device comprises both sensors 20 and actuators 33. By way of example, this could include a motor. According to the invention, the signals coming from the sensor 20 are digitised and sent to a processing station 25 where they are analysed and compared for example with reference values. The result of the comparison represents a correction to be made to the control signal for one or more actuators 33 present on the implementation device. This correction is the result of an algorithm suited to the process being monitored (for example, adaptative commands or on-line identification of the process). The sequence of digital signals obtained is sent to the local area network 10, and then feeds a digital to analogue conversion unit where a correction signal is generated and sent to the corresponding actuator 33. Alternatively, in place of the digital to analogue converter, a pulse-width modulation device is used, the function of which is to convert a digital signal into a signal whose pulse width depends on the correction to be made to the actuator command. This modification to the command of the actuator 33 modifies the value of the parameter or parameters whose value was detected outside an envelope or reference signal.

The invention has just been described with reference to advantageous embodiments. It is obvious that variations may be made to these embodiments without departing from the concept of the invention.

I claim:

1. Device for continuously controlling a manufacturing process, in order to perceive continuously any transient or perturbational phenomena occurring during this process, a device comprising:

a) a local area network;

b) at least one remote monitor connected to said local area network through a first interface for receiving, in real time, signals in order to control the manufacturing process;

c) a plurality of sensors, each of said sensors measuring a value of one of a plurality of parameters of the manufacturing process and transforming said value so as to produce an analogue signal;

d) a plurality of analogue to digital converters, each of said analogue to digital converters connected to one of said sensors and located proximate thereto, each of said analogue to digital converters receiving one of said analogue signals in order to convert said one of said analogue signals into a sequence of numerical values representing an instantaneous state over time of the corresponding parameter, each of said analogue to digital converters being connected to said local area network through a second interface;

e) processing means connected through a third interface to said local area network for storing and processing said sequences of numerical values and comparing said sequences of numerical values with predetermined reference values in order to generate a plurality of comparison signals, said local area network conveying said comparison signals to said remote monitor and from said analogue to digital converters to said processing means.

2. Device according to claim 1, characterised in that said processing means are arranged so as to receive, process and store the values coming from a plurality of sensors via their respective analogue to digital converters.

3. Device according to claim 1, further comprising a plurality of second processing means, each of said second processing means being associated with one of said sensors.

4. Device according to claim 1, characterised in that said processing means comprise:

i) means for transforming said sequences of numerical values into frequency variation signals representing frequency variations of said analogue signals and then, after generating said frequency variation signals, storing said frequency variation signals;

ii) an analyser receiving said frequency variation signals in order to convert said frequency variation signals into a limited number of objective characteristics; and iii) storage means for storing the said limited number of objective characteristics.

5. Device according to claim 4, characterised in that the means for transforming said sequences of numerical values into frequency variation signals effects a discrete Fourier transform.

6. Device according to claim 5, further comprising:

i) a plurality of actuators for implementing the process, each of said actuators being controlled by one of a plurality of control signals, each of said control signals influencing the value of at least one corresponding parameter of the process, said processing means also producing with said comparison signals a plurality of digital correction signals for modifying said control signals addressed to said actuators; and ii) a digital to analogue converter associated with each of said actuators for converting said digital correction signals into a plurality of corresponding analogue correction signals, each of said analogue correction signals being addressed to a corresponding one of said actuators said processing means being connected to said digital to analogue converters by means of said local area network.

7. Device according to claim 5, further comprising:

i) a plurality of actuators for implementing the process, each of said actuators being controlled by an analogue control signal which influences the value of at least one corresponding parameter of the process, said processing means producing, as a result of comparing said sequences of numerical values with the predetermined values, a plurality of digital correction signals, each of said digital correction signals for modifying one of said control signals addressed to one of said actuators; and ii) a pulse-width modulation device associated with each of said actuators for converting said digital correction signals into a plurality of corresponding variable pulse width signals, each of said pulse-width modulation devices modifying accordingly the value of the associated parameter or parameters, said processing means being connected to each of said pulse-width modulation devices by means of said local area network.

8. Device for continuously controlling a manufacturing process, in order to perceive continuously any transient or perturbational phenomena occurring during this process, a device comprising:

a) a local area network;

b) at least one remote monitor connected to said local area network through a first interface for receiving in real time signals in order to control the state of the manufacturing process;

c) a plurality of sensors, each of said sensors being associated with one of a plurality of parameters of the manufacturing process and measuring a value of said one of said plurality of parameters and transforming said value so as to produce an analogue signal;

d) a plurality of analogue to digital converters, each of said analogue to digital converters being connected to one of said sensors and situated proximate thereto and receiving said analogue signal in order to convert said analogue signal into a sequence of numerical values representing an instantaneous state over time of said plurality of parameters, each of said analogue to digital converters being connected to the local area network through one of a plurality of second interfaces;

e) a plurality of actuators, each of said actuators acting on a device for modifying at least one of the parameters;

f) a digital to analogue converter associated with each of said actuators, each of said digital to analogue converters being connected to said local area network through one of a plurality of third interfaces;

g) processing means connected through a fourth interface to said local area network for storing and processing said sequences of numerical values and comparing said sequences of numerical values with predetermined reference values in order to generate a comparison signal, said local area network conveying said sequences of numerical values from said analogue to digital converters to said processing means and said comparison signal to said remote monitor or monitors.

* * * * *